J. Dane,
Saw-Mill Head-Block.

Nº 4,009.   Patented Apr. 22, 1845.

UNITED STATES PATENT OFFICE.

JAMES DANE, OF WEST DERBY, VERMONT.

SAWMILL-CARRIAGE.

Specification of Letters Patent No. 4,009, dated April 22, 1845.

*To all whom it may concern:*

Be it known that I, JAMES DANE, of West Derby, in the county of Orleans and State of Vermont, have invented a new and useful Improvement in Machinery for Sawing Logs or Timber into Boards, Joists, &c., and that the following description and accompanying drawings, taken together, constitute a full and exact specification of the construction and operation of the same.

Figure 4:
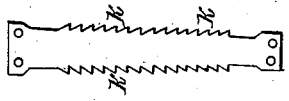
Figure 3:
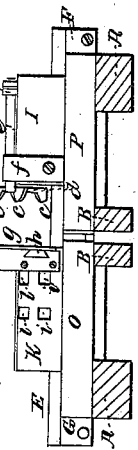
Figure 2:
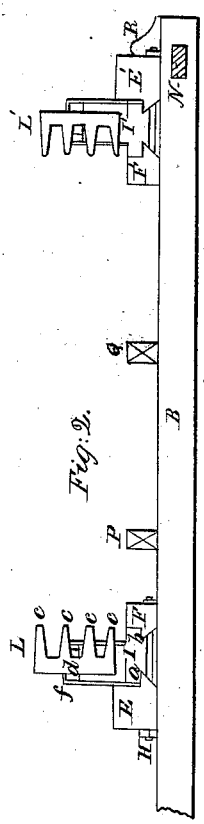
Figure 1:
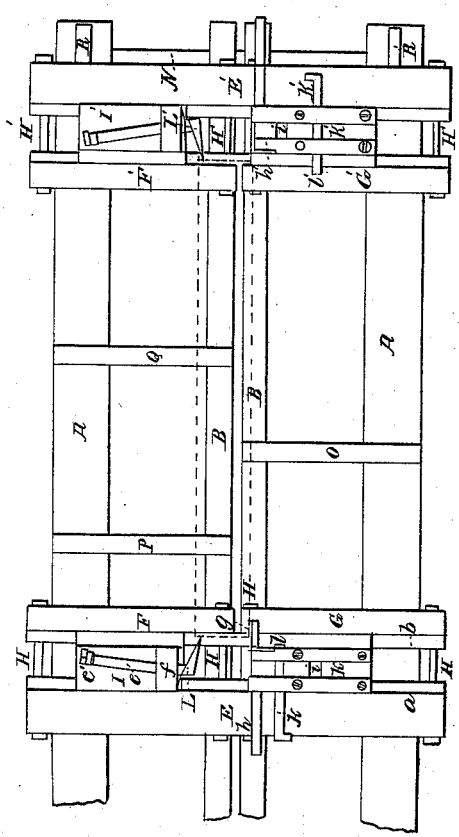

Figure 1, of the drawings above mentioned represents a top view of my improved mechanism. Fig. 2, is a longitudinal and central section thereof. Fig. 3, is a transverse vertical section taken through that part in which the log to be sawed generally rests. Fig. 4, is a view of the saw.

A, A, Figs. 1 and 2, denote the ordinary rail timbers of the carriage of a saw mill. Centrally between and parallel to them, are interposed two other rail timbers B, B, the said timbers being arranged so as to very nearly touch each other or so as to leave a space between them of sufficient width for the vertical saw to travel in as it passes from one part of the carriage toward the other. The central rail timbers are of the same height as the lateral ones.

A frame composed of three timbers E, F, G, (the former being arranged parallel to the latter two,) secured together by four bolts H, H, H, H, is disposed transversely and so as to slide freely longitudinally upon the rail timbers B, B, A, A, the ends of the timbers F, G, being at a distance apart corresponding to the space between the central rails B, B. This frame supports within it two head blocks I, K, which are each arranged in rabbets $a$, $b$, and so as to be moved at pleasure toward or from the path in which the saw travels, and may have any convenient and suitable mechanism by which they may be confined in any desirable positions. The head block I sustains the dog L, which consists of a series of teeth ($c$, $c$, $c$, Fig. 2) projecting horizontally from a vertical bar $d$; the said bar being united at its center to a horizontal shank $e$, which projects at right angles to it, rests upon the top of the head block, turns horizontally upon a fulcrum or joint at $e'$ and is kept down upon the block by a strap or stirrup $f$, secured to the block as seen in the drawings. The object of the dog is to secure the end of the log or timber in position against the gage plate on the other head block; and this is accomplished, when the timber rests against the gage plate, by driving the teeth of the dog into the end of the timber, the said timber or log being represented in the drawings by red lines.

The gage plate consists of a rectangular plate of metal $g$, raised vertically upon the end of a horizontal slide bar $h$, which is secured in guides so as to be slid in the direction of its length. It is adapted to the inner end of the head block K. It should be capable of being moved in a direction toward the log, so as to bring the vertical gage plate (upon it) into the position represented in the drawing where the end of the timber to be sawed is seen as resting against the gage plate. The movement of it in the reverse direction should be sufficient to bring the gage plate into the position as denoted at $h'$, or so that its front vertical edge may be brought into the plane of the front face of the head block, and thereby be moved a short distance beyond the end of the log or timber to be sawed.

One or more apertures $i$, $i$, &c., may be formed, (horizontally,) through the block from one side to the other through either of which (apertures) a straight dog $k$ (having its inner end $l$ pointed or sharpened) may be inserted and driven into the log in order to confine it in the right position upon the rest timbers, for the removal of the first slab.

Another frame of timbers, E', F', G', having head blocks I, K', dogs L', $k'$, and arranged in all other respects like that before mentioned, is placed, in a similar manner, upon the other end of the carriage, as seen in the drawings. For the security of the horizontal timbers A, A, B, B, in their proper positions, they are tied by cross timbers N, N, N, N, extending from one to the other and bolted or otherwise properly confined to them.

The saw which is used is arranged in a frame so as to play up and down, vertically, in the usual manner. It has teeth $k$ $k$ formed upon both vertical edges, as seen in Fig. 4, the object of the same being to cause it to operate, when the carriage is moved longitudinally, as well backward as forward, and thus save the time, labor and power generally consumed in running the carriage back, at every time the saw has completed its passage through the log, in order to commence the succeeding operation or path of the saw, at the same end of the log, as that was which has last been completed. To effect the proper movement of the carriage in an opposite direction, the pinion shaft by which it is generally operated should have another ratchet wheel upon it having its teeth set in opposite directions to those of the ratchet wheel which moved the carriage forward; and the pawls should be so arranged with respect to the second ratchet wheel, as to impart to it the proper movement.

One transverse timber O extends from the top of one of the central rail timbers B, B, to that of the outside rail A on the same side of the center with it; the height of the said transverse timber being equal or about equal to that of the timber F. Two other similar timbers P, Q extend in a similar manner from the top of the other central rail B to that of the other outside rail of the carriage, the said timbers being bolted down upon the tops of the rail timbers. The second frame, which supports the head blocks, rests against shoulders R, R, elevated upon the outside rail timbers.

The peculiar object of the transverse timbers O, P, Q, is to afford one or two intermediate points of support for the log to be sawed, which, generally speaking, rests only at its ends, upon the timbers which support the head blocks. The object of the central rail timbers is to support the transverse timbers O, P, Q and central parts of the slide frames which carry the head blocks.

By means of the gage plates applied to the head blocks the thickness of the board, or piece of timber to be sawed from the log is regulated. The head blocks are moved up so as to bring the gage plates at the proper distance from the saw, and are there confined. The plane faces of the side at the ends of the timber are then to be brought against the gage plates, and the dogs of the other head blocks driven into the ends of the timber. The saw is then set in motion and after passing through the stick from one end to the other the gage plates are moved back into the position as seen at $h'$, and the board, or piece separated drops or falls over upon the tops of the rest timbers, and is moved away therefrom. This being accomplished the whole stick and head blocks by which it is held are moved up toward the gage plates, and confined as before. The saw retraces its path and cuts another board in so doing, and so the operation goes on.

Having thus concluded my description I shall claim—

The employment and use of the longitudinal center rail pieces B, B and transverse rest bars, O, P, Q as combined with or applied to the rectangular carriage, and for the purposes as above described.

In testimony that the above is a correct specification I have hereto set my signature this third day of February, A. D. 1844.

JAMES DANE.

Witnesses:
R. H. EDDY,
D. A. GRANGER.